US011398736B1

(12) United States Patent
McCaig et al.

(10) Patent No.: US 11,398,736 B1
(45) Date of Patent: Jul. 26, 2022

(54) BATTERY SAFETY MANAGEMENT SYSTEM

(71) Applicant: ASSETT, Inc., Manassas, VA (US)

(72) Inventors: Robert L McCaig, Marshall, VA (US); John McLaughlin, Manassas, VA (US)

( * ) Notice: Subject to any disclaimer, the term of this patent is extended or adjusted under 35 U.S.C. 154(b) by 0 days.

(21) Appl. No.: 17/402,196

(22) Filed: Aug. 13, 2021

(51) Int. Cl.
*H02J 7/00* (2006.01)
*G01D 21/02* (2006.01)

(52) U.S. Cl.
CPC ............ *H02J 7/0031* (2013.01); *G01D 21/02* (2013.01); *H02J 7/0019* (2013.01); *H02J 7/0047* (2013.01)

(58) Field of Classification Search
CPC ...... H02J 7/0019; H02J 7/0031; H02J 7/0047; G01D 21/02
USPC ................................. 320/122, 134, 158, 163
See application file for complete search history.

(56) References Cited

U.S. PATENT DOCUMENTS

| | | | |
|---|---|---|---|
| 8,084,154 B2 | 12/2011 | Scheucher | |
| 9,267,993 B2 | 2/2016 | Farmer et al. | |
| 9,869,726 B2 | 1/2018 | Zumstein et al. | |
| 2011/0039137 A1 | 2/2011 | Engle et al. | |
| 2011/0169450 A1* | 7/2011 | Hudnall | H02J 7/0019 320/114 |
| 2015/0191162 A1* | 7/2015 | Dao | B60L 58/12 701/22 |
| 2017/0190257 A1 | 7/2017 | Chuang | |

OTHER PUBLICATIONS

Wikipedia, Electric battery. Last edited on Aug. 2, 2021, at 06:10 (UTC).
Wikipedia, Electric vehicle battery. Last edited on Jul. 5, 2021, at 08:44 (UTC).
Wikipedia, Lithium-ion battery. Last edited on Aug. 11, 2021, at 20:35 (UTC).

* cited by examiner

*Primary Examiner* — Edward Tso
*Assistant Examiner* — Aaron Piggush
(74) *Attorney, Agent, or Firm* — Stonebridge IP, PLLC

(57) ABSTRACT

This disclosure provides a battery management process and system including a battery including one or more batteries, a powered battery charging system connected to each of the one or more batteries to provide charge or charge balancing power to the one or more batteries, one or more battery sensors configured to monitor each batteries, a battery monitoring unit comprising a processor and memory in communication with the one or more battery sensors, the battery monitoring unit configured to initiate and conduct a charging or balancing process and monitor the battery for an out of tolerance condition, wherein if during charging or balancing an out of tolerance condition occurs in one or more batteries the battery monitoring unit interrupts the charging or balancing, process of the batteries by disconnecting the batteries with the out of tolerance condition from the charging system, the battery monitoring unit provides an alert to an operator to separately interrupt the charging or balancing process to the batteries with the out of tolerance condition via a separate operator controlled switch, and the battery monitoring unit interrupts power to the battery charging system providing power to the batteries with the out of tolerance condition.

20 Claims, 16 Drawing Sheets

FIG. 3

| PRIMARY CBMU | | | EPO | SIREN | SECONDARY CBMU | | |
|---|---|---|---|---|---|---|---|
| String 1 ○ | HIGH TEMPERATURE | ○ | SCCP Power | Alarm Ack/Clear Enable | String 1 ○ | HIGH TEMPERATURE | ○ |
| String 2 ○ | LOW TEMPERATURE | ○ | AUDIO OFF / AUDIO ON | | String 2 ○ | LOW TEMPERATURE | ○ |
| String 3 ○ | OVER VOLTAGE | ○ | Lamp Test OFF/ON | | String 3 ○ | OVER VOLTAGE | ○ |
| String 4 ○ | OVER CURRENT | ○ | SCCP Power OFF/ON | Alarm Ack/Clear | String 4 ○ | OVER CURRENT | ○ |
| | LOW VOLTAGE | ○ | | Alarm Ack/Clear | | LOW VOLTAGE | ○ |
| | VOLTAGE MISMATCH | ○ | | | | VOLTAGE MISMATCH | ○ |
| | WATER INTRUSION | ○ | | | | WATER INTRUSION | ○ |
| | COMMUNICATION | ○ | | | | COMMUNICATION | ○ |
| | OVER PRESSURE RATE | ○ | | | | OVER PRESSURE RATE | ○ |
| Comms Time out ○ | Comms ○ | | | | Comms Time out ○ | Comms ○ | |

BATTERY SAFETY MANAGEMENT SYSTEM

FEDERALLY SPONSORED RESEARCH AND DEVELOPMENT

This invention was made with government support under contract H92222-16-C-0046 awarded by U.S. Special Operations Command (SOCOM). The government has certain rights in the invention.

BACKGROUND OF THE DISCLOSURE

Field of the Invention

This disclosure is directed to battery management systems and processes and includes systems and methods for safely managing charge and discharge of batteries.

Description of the Related Art

There exists a need for extended endurance for electric powered vehicles. This capability is primarily available today using lithium-ion batteries. However, vehicles developed with this technology have caught on fire due to overcharge of the lithium-ion battery. The U.S. Navy, in fact, removed all lithium-ion technology from their vehicle batteries after a vehicle fire in 2008.

Accordingly, there is a need in the art for improved charging and balancing capabilities for lithium-ion batteries in vehicles that is capable of detecting and preventing catastrophic failure prior to its occurrence.

SUMMARY OF THE INVENTION

This disclosure provides a battery management process and system including a battery including one or more batteries, a powered battery charging system connected to each of the one or more batteries to provide charge or charge balancing power to the one or more batteries, one or more battery sensors configured to monitor each batteries, a battery monitoring unit comprising a processor and memory in communication with the one or more battery sensors, the battery monitoring unit configured to initiate and conduct a charging or balancing process and monitor the battery for an out of tolerance condition, wherein if during charging or balancing an out of tolerance condition occurs in one or more batteries the battery monitoring unit interrupts the charging or balancing, process of the batteries by disconnecting the batteries with the out of tolerance condition from the charging system, the battery monitoring unit provides an alert to an operator to separately interrupt the charging or balancing process to the batteries with the out of tolerance condition via a separate operator controlled switch, and the battery monitoring unit interrupts power to the battery charging system providing power to the batteries with the out of tolerance condition.

The battery management system may provide an alert to an operator to separately interrupt the charging or balancing process via a second switch. The battery management system may provide an alert to an operator to separately interrupt the charging or balancing process by separately interrupting power to all batteries. The battery management system may provide an alert to an operator to separately interrupt the charging or balancing process by interrupting the charging or balancing process via a third switch. The battery may be a lithium-ion battery.

Other features and aspects will be apparent from the following detailed description, the drawings, and the claims.

BRIEF DESCRIPTION OF THE DRAWINGS

FIG. 16 is a continuation of FIG. 1A and shows a partial view of a HESS System (Charging and Balancing Configuration) with Subsystems (CBMS and Battery) and Major Hardware.

FIG. 3 shows a SCCP-2 Panel Layout (Switches and Indicators).

FIG. 56 shows a continuation of FIG. 5A and a partial view of an embodiment of CBMS Software Architecture.

FIG. 8 shows an embodiment of SCCP-1 Panel Configuration.

FIG. 10 shows an embodiment of SCCP-2 Panel Configuration.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

A High energy storage system (HESS) may include two subsystems (e.g., Critical Battery Management Subsystem (CBMS) and the Battery). This system may also include sensors, sensor acquisition, and interface between the Battery and CBMS. In embodiments, these last three components may reside within the battery assembly.

Figure 1A:
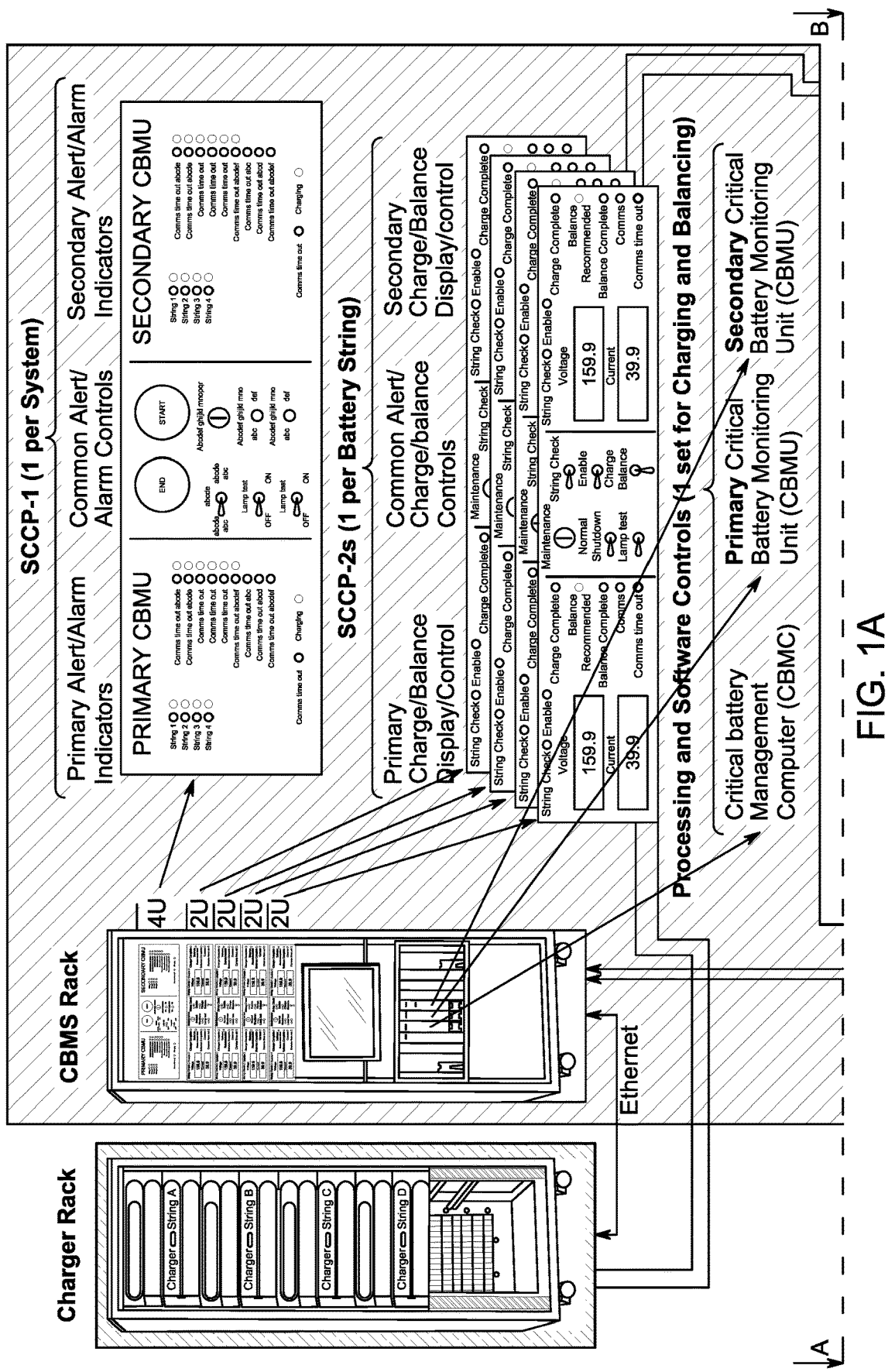
FIG. 1A shows a partial view of a HESS System (Charging and Balancing Configuration) showing Subsystems (CBMS and Battery) and Major Hardware.
Figure 1B:
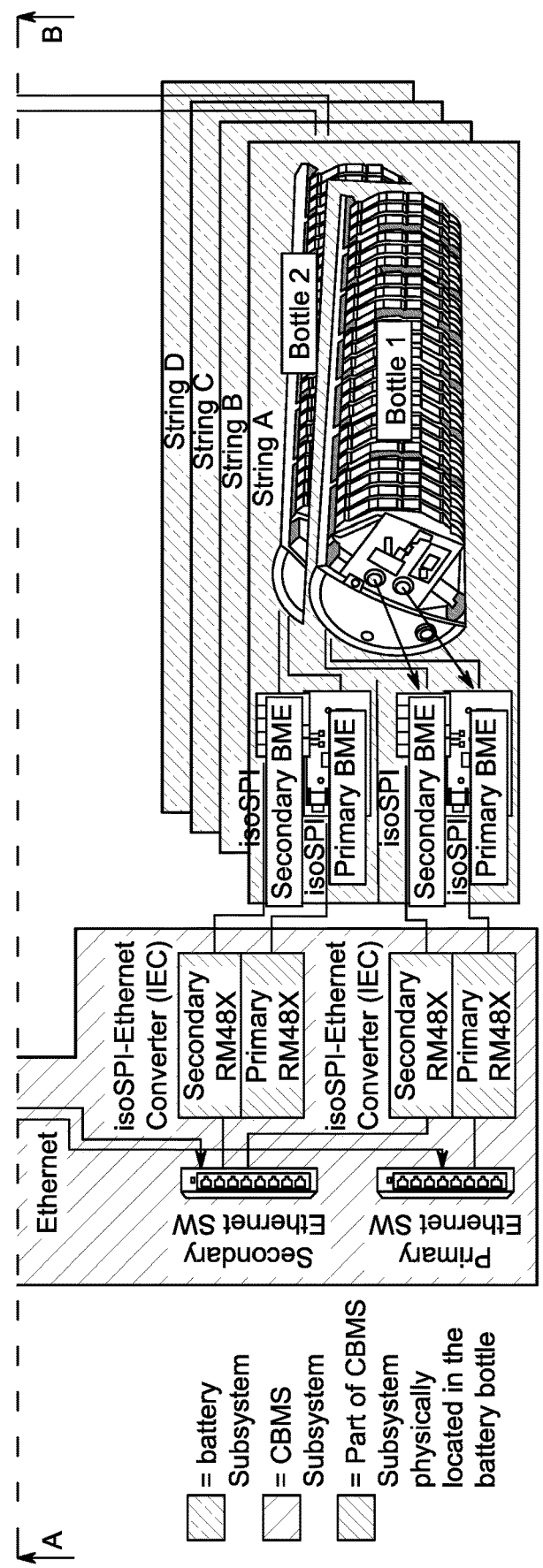

The disclosed critical battery management system may be implemented in several configurations: In one embodiment, (See FIGS. 1A and 1B) the system manages and controls the battery during the charging and balancing operations and is located on-board a host platform in a charging station. The major hardware elements in this configuration are: (1)

Figure 2:
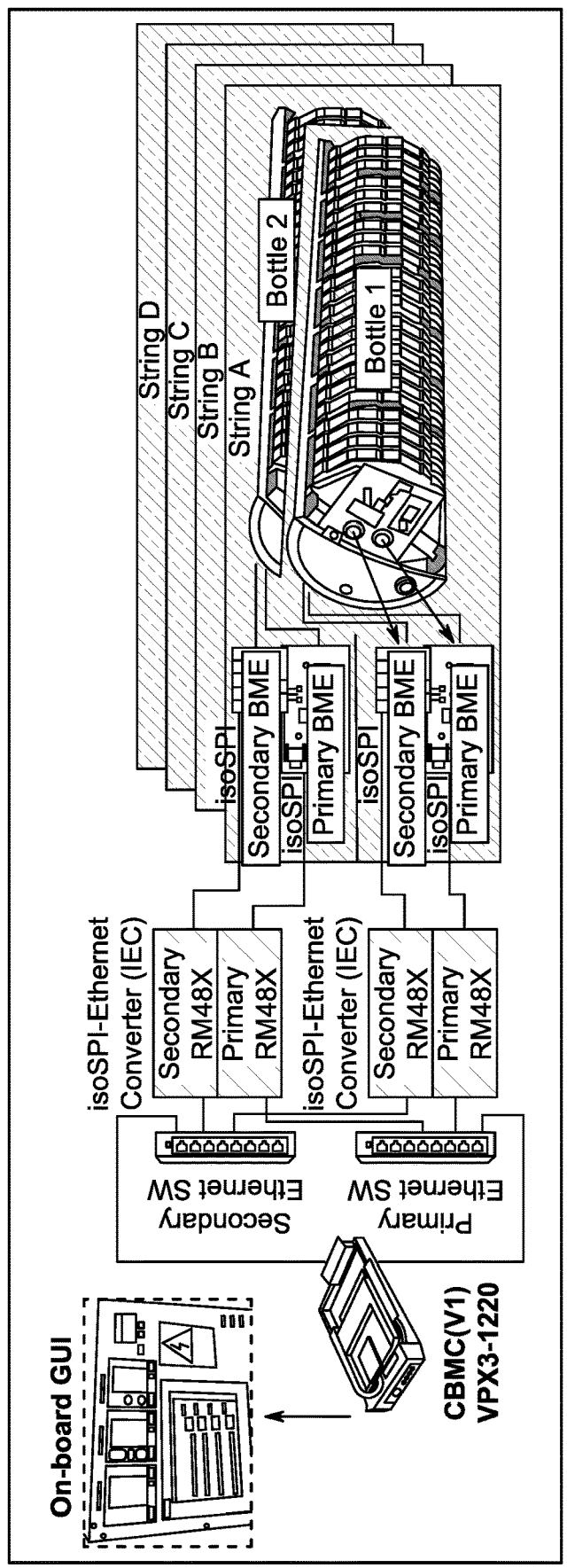
FIG. 2 shows HESS System and a Vehicle Configuration.

Critical Battery Management Computer including a processor and memory (CBMC(V2)), (2) Redundant Critical Battery Monitoring Units (CBM Us), (3) Ethernet Switch, (4) Graphical User Interface (GUI) processor, (5) Safety Critical Control Panels (e.g., −1, −2), (6) Redundant isoSPI to Ethernet Converters (IECs), (7) Battery Measurement and Equalizers (BMEs) contained in the Battery Subsystem. In another embodiment, the battery management system (See FIG. 2) is self-contained on a vehicle and monitors the condition of the battery. The major hardware elements in this embodiment are: (1) CBMC(V1), (2) redundant isoSPI to Ethernet Converters (IECs), (3) Battery Measurement and Equalizers (BMEs) contained in the Battery system. This configuration also supports the storage of the battery by monitoring the condition of the battery and any events within the battery which may limit battery usage (e.g., cell eruption, cell voltage below the lower limit for charging, loss of bottle pressure). The CBMS is designed to be scalable and can accommodate from one to seven strings with minimal software changes.

A detailed description of operation of an embodiment is provided below.

Figure 3:
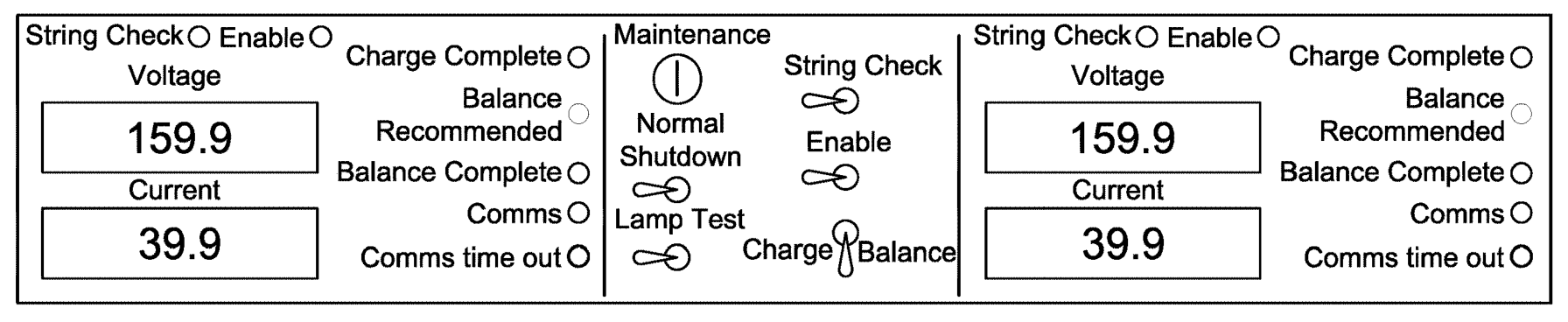

With a vehicle on-board a host platform and fully secured, and the charging and CBMS racks installed and correctly connected, the operator may connect two Ethernet cables that are between the back of the CBMS rack and the battery. These redundant interfaces enable the monitoring and control of the battery while on-board the vehicle. These two Ethernet cables connect to the battery via a High Voltage (HV) panel. Power cables are then installed from each of the SCCP-2's to the associated batteries. Once the system is fully cabled, the operator can power the CBMS on by activating the power on switch at the lower right of the processor chassis and the power on switch on SCCP-1. At this point, the operator can download battery sensor data. This data is downloaded from CBMC (V1) into CBMC(V2). The operator can also initiate the battery monitoring process where he can observe State of Charge (SOC) on the CBMC GUI, voltage and current of each battery on an associated SCCP-2 digital readout, and any alerts or alarms displayed on SCCP-1. The sensor data from the battery is compared to the action limits at a 1 Hz rate. If there are no alerts or alarms present in a string, the operator can initiate a charging or balancing process, if required. If a charging process is required, the operator enters the 'charge to voltage' for the charging process on the CMBC (V2) GUI. The operator may be prohibited from entering a voltage greater than 4.2 volts at the individual cell level to prevent an over voltage condition. From this point, both the charging and balancing processes are initiated with a three-step procedure that requires operator actions in conjunction with the appropriate responses of the software. See Table 1 and FIG. 3.

TABLE 1

3-Step Process to Initiate Charging or Balancing.

| Step | Description | Operator Action | CBMU Software Action Response | Result |
|---|---|---|---|---|
| 1 | String Check for alarms | Move "String Check" switch to "ON" on the SCCP-2 | If no alarms the CBMU returns a "1" indicating no alarms are present. Otherwise, the CBMU returns a "0" | If the "No faults" signal is a "1" and the "String Check switch remains "ON", the "String Check OK" is illuminated on the SCCP-2 and Step 2 can be initiated. Otherwise no further steps can be taken |
| 2 | Activates an enable signal to the "Charge/Balance" switch | Move the "Enable" switch to "ON" on the SCCP-2 | If the CBMU recognizes that the "Enable switch is "ON", the CBMU returns a "1" indicating that a Charging or Balancing process is to be requested. Otherwise, the CBMU returns a "0" | If "Enable Recognized is a "1" and the "Enable "switch remains "ON", the "Enable OK" is illuminated on the SCCP-2 and the center terminal on the "Charge/Balance" 3-position toggle switch is activated in preparation for step 3. If any of the above conditions are not met, then no further steps can be taken |
| 3 | Activates the Charging or Balancing Process | Moves the 3-position toggle from the center position to the left to charge or to the right to balance | If the CBMU recognizes the position of the 3-position toggle switch, the CBMU software will respond with a "Charge Confirmed" or "balance confirmed " | If the "String Check" and "Enable" switches remain "ON" and the 3-position switch is in the Charge" position (to the left), the Charging process is initiated. Or if the 3-position switch is in the Balance position (to the right) the balance process is initiated. If any one of these conditions are not met, then no process is initiated |

If the string Maintenance switch is in the OFF position, the batteries can enter either the charge or balance process. If the Maintenance switch is in the ON position, the charging process is prohibited. The initiation of the charging process (e.g., switches in the right positions and correct responses from the redundant CBMUs) results in a 12-volt activation signal to each of the high-power contactors which are connected in series. If either CBMU does not respond to the request to charge, the associated contactor will not close.

Once the charging or balancing process is on-going, if an out of tolerance condition (alarm) occurs, the contactors will open. There are provided at least three mechanisms to stop the condition from becoming a catastrophic fault. The disclosed CBMS provides the following mechanisms: (1) The CBMU will send a 'faults detected' signal to the SCCP-2 that is managing the string containing the out of tolerance condition to open the contactors, (2) the operator will move the 'String Check' or the 'Enable' switch to off to open the contactors (after an operator alert), (3) the operator will move the "Charge/Balance" switch to neutral to open the contactors (after an operator alert), (4) The CBMC(V2) software will power down the charger connected to the string with the out of tolerance condition, (5) the operator (after an operator alert) will activate the Emergency Power Off (EPO) switch which opens the contacts by eliminating the power source for the 12-volts and (6) the operator (after an operator alert) will be instructed to turn off the chargers at the charge cabinet (STOP), if other mechanisms fail.

The normal charging process will terminate when the 'charge to voltage' is reached (entered by the operator prior to starting the charging process). When this occurs, the CBMC (V2) commands the charger to transition from constant current to constant voltage. Once the current drops to below 2 amps each CBMU will open its associated contacts.

During the balancing process, if an out of tolerance condition (alarm) occurs the primary CBMU will stop sending the balance command to the IEC which forwards that command to each BME being balanced. The balance process is terminated by: (1) in any out of tolerance condition, the CBMU will stop sending the balance command to the IEC which will terminate the balancing process, (2) the operator will move the "String Check" or the "Enable" switch to off, (3) the operator will move the "Charge/Balance" switch to neutral (4) the BME will stop the balancing process if communications between the CBMU and IEC are lost after 250 milliseconds.

If there are no Ethernet connections to the IEC contained in the battery bottle, the RM48X transitions into a low power condition. When in this condition, the IEC continues to monitor the pressure sensors for a spike in pressure. If a spike occurs which would be an indication of a cell rupture, the event is stored in the RM48X memory for later retrieval. Periodically, the operator can download this pressure event information from the IEC along with voltage data to ensure that the battery remains in a satisfactory condition for charging or balancing.

TABLE 2

The functionality of the major hardware elements of the CBMS and their interfaces.

Table 2- Major Hardware Elements and Interface Functionality

| Major H/W Element | Functionality | Interfaces with | Interface Type | Messages/Functionality |
|---|---|---|---|---|
| CBMC (V2) | Control each charger 3$^{rd}$ Processor of battery sensors | Charger CBMU | Ethernet Redundant Ethernet | Control the charger Exchange of alerts and alarms Battery sensor data for processing and storage. Diagnostic data |
| CBMC (V1) | Monitor and store battery data. Sets alerts and alarms to provides this info to the GUI | IEC | Redundant Ethernet | Battery sensor data Battery pressure spike events |
| CBMC(V1) | Download battery data captured and stored during a sortie | CBMC(V2) | Ethernet | Provides access to data gathered during a sortie for analysis to ensure that the battery is in a safe condition to charge or balance |
| CBMU | Monitor battery sensor data Perform diagnostics. | IEC | Redundant Ethernet | Battery sensor data IEC Diagnostic data IEC control BME controls (balancing, and diagnostics) |
| | Set alarms and alerts. Clears or acknowledges alerts and alarms | SCCP-1 | Redundant RS232 | Message routing information Register data to illuminate specified LEDs. Activate the audible alarm. Position of the EPO switch Positions of the clear and acknowledge switches Notification to each CBMU to Clear and acknowledge alarms and alerts |
| IEC | Acquires battery voltage and temperature data. Converts isoSPI to Ethernet | BME | Redundant isoSPI or discrete signals | Virtual cell voltage Electronics voltages Virtual cell temperature Electronics temperature Bottle voltage Bottle current Pressure Water intrusion BME diagnostics BME controls (e.g., balancing) |

TABLE 2-continued

The functionality of the major hardware elements of the CBMS and their interfaces.

Table 2- Major Hardware Elements and Interface Functionality

| Major H/W Element | Functionality | Interfaces with | Interface Type | Messages/Functionality |
|---|---|---|---|---|
| SCCP-1 | Display of alerts and alarms from each CBMU Clear and acknowledge switch configurations for alerts and alarms. | Primary and Secondary CBMU | Redundant RS232 | Message routing information Register data to illuminate specified LEDs. Activate the audible alarm. Position of the EPO switch Positions of the clear and acknowledge switches |
| SCCP-1 | Route information from the RS232 to SCCP-2 | SCCP-2 | Redundant Differential I2C | The position of String Check, Enable, Charge/Enable, Maintenance, and Normal Power Down switches Data to populate the digital readouts for current and voltage |
| SCCP-2 | Contactor Control | SCCP-1 | Redundant differential I2C | Reads "Sting Check", Enable, Charge/Balance, Lamp test, and Maintenance Switches. When switch activation occurs in the right sequence and not in maintenance the SCCP-2 is sent a command to enable the charge or balance state. When in charge or balance state, if an out of tolerance condition is detected by either CBMU, the CBMU sends SCCP-2 the command to open contacts. |
| Graphical User Interface | Displays the status of the battery(ies) | CBMC(V2) | Ethernet | Displays interface status, BME status, and diagnostic data. Allows the operator to input the "charge to" voltage |

The hardware architecture for CBMS is built around processors that are safety certifiable and interfaces that are widely used and commercially available. The CBMC (V1), CBMC (V2), and the redundant CBMU processors may be Curtiss Wright VPX3-1220™. These Single Board Computers (SBCs) have been safety certified on multiple platforms. In embodiments, the IEC processor may be the Texas Instruments RM48X™. The RM48X is safety certifiable to IEC 61508 and a safety technical data package is available.

The CBMS is the only subsystem within HESS that has any form of software. The software architecture within CBMS may be built around the Green Hills Integrity 1786 Operating System (OS). The Green Hills OS is compatible with the Curtiss Wright VPX3-1220 SBC and can be safety certified. The OS provides real-time management of the software applications (software modules), intercommunications between software modules, external communications, and performance monitoring of the software. The software modules written for the CBM Us, CBMC(V2) and CBMC (V1) may be written using the C++ language.

In embodiments, the software module may be employed without an OS, which can be referred to as 'bare metal'. This embedded code is written using the C language.

Figure 4A:
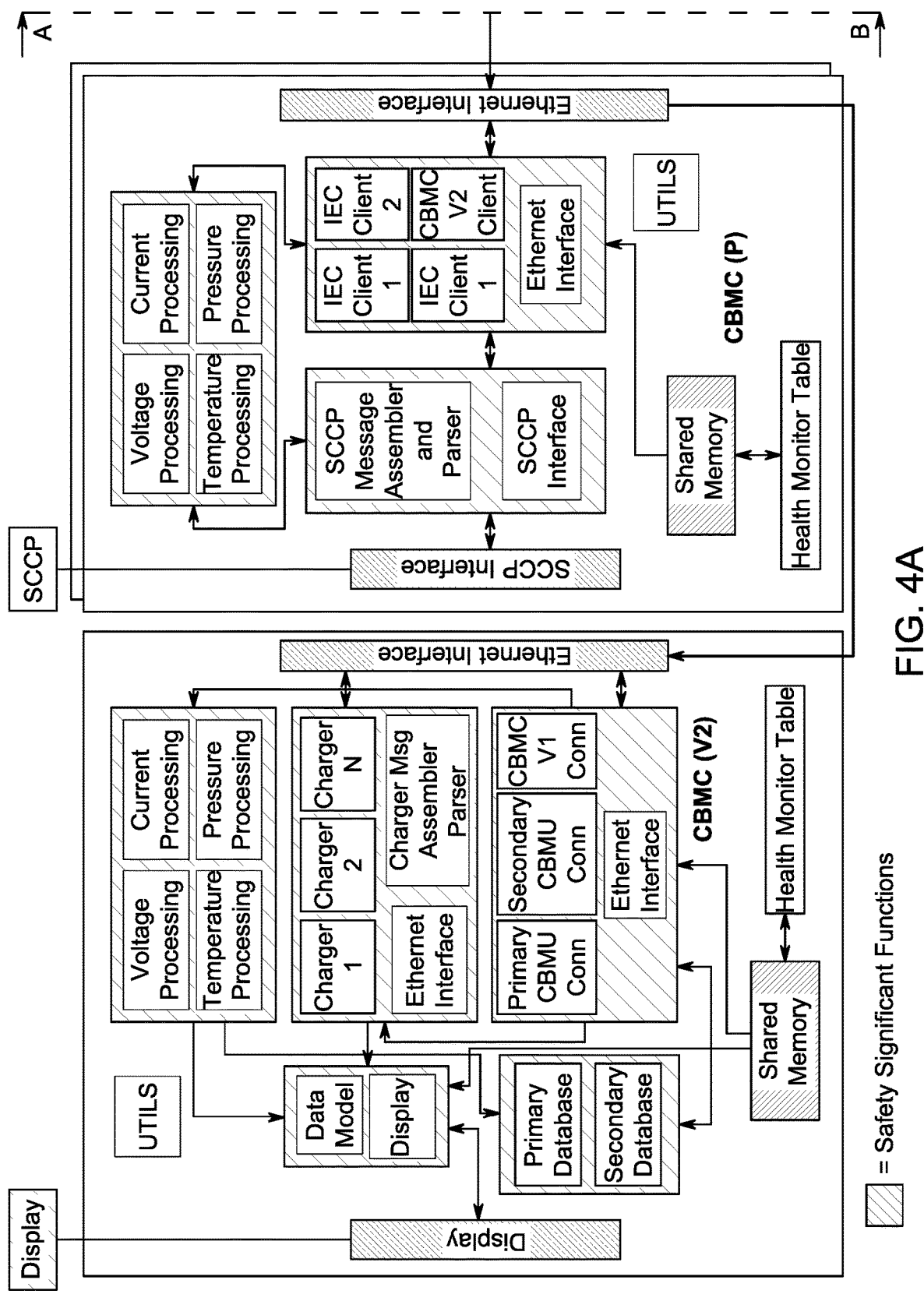
FIG. 4A shows a partial view of an embodiment of CBMS Software Architecture (Charging/Balancing Configuration).
Figure 4B:
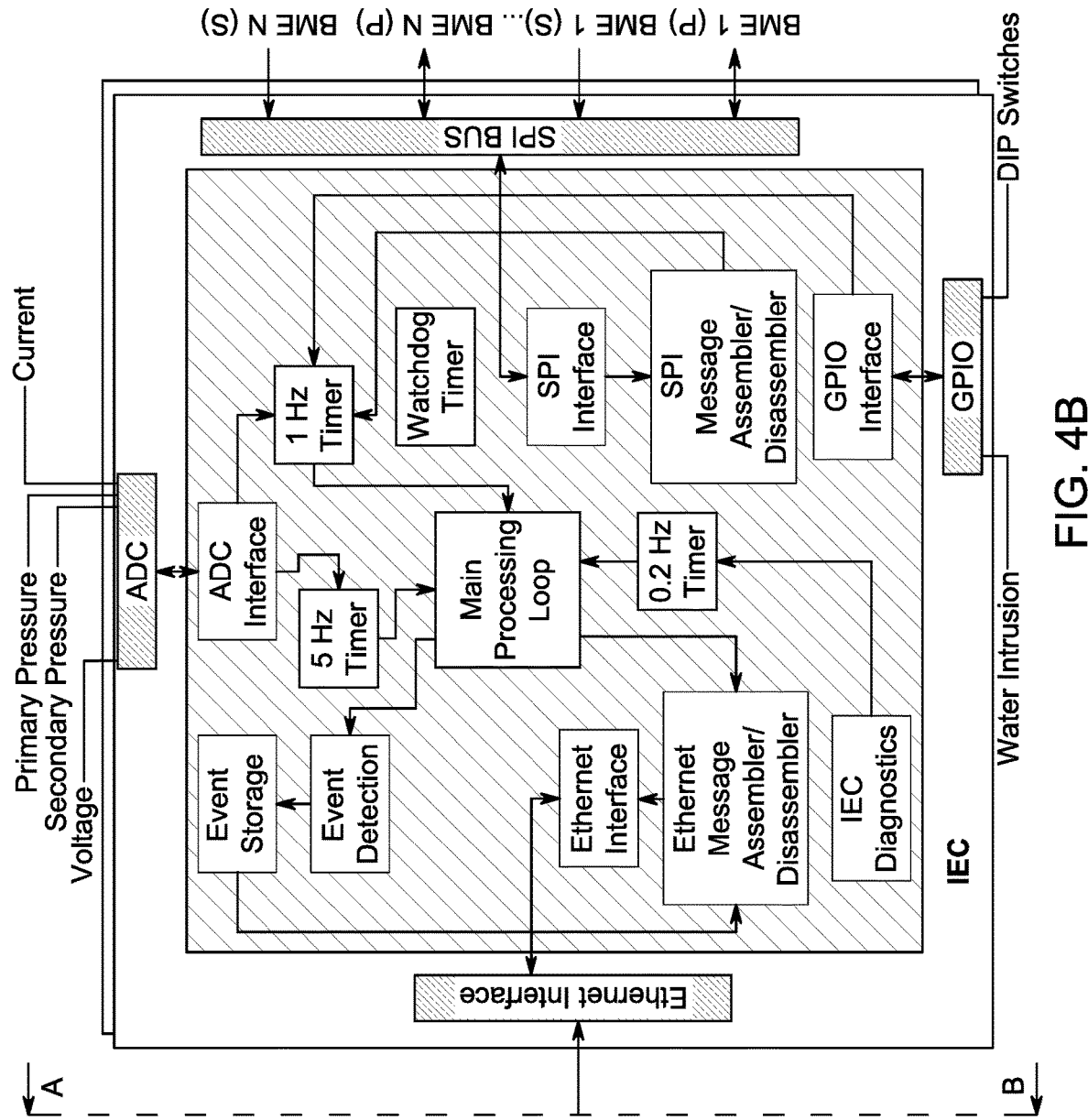
FIG. 4B is a continuation of FIG. 4A and shows a partial view of an embodiment of CBMS Software Architecture (Charging/Balancing Configuration).
Figure 5A:
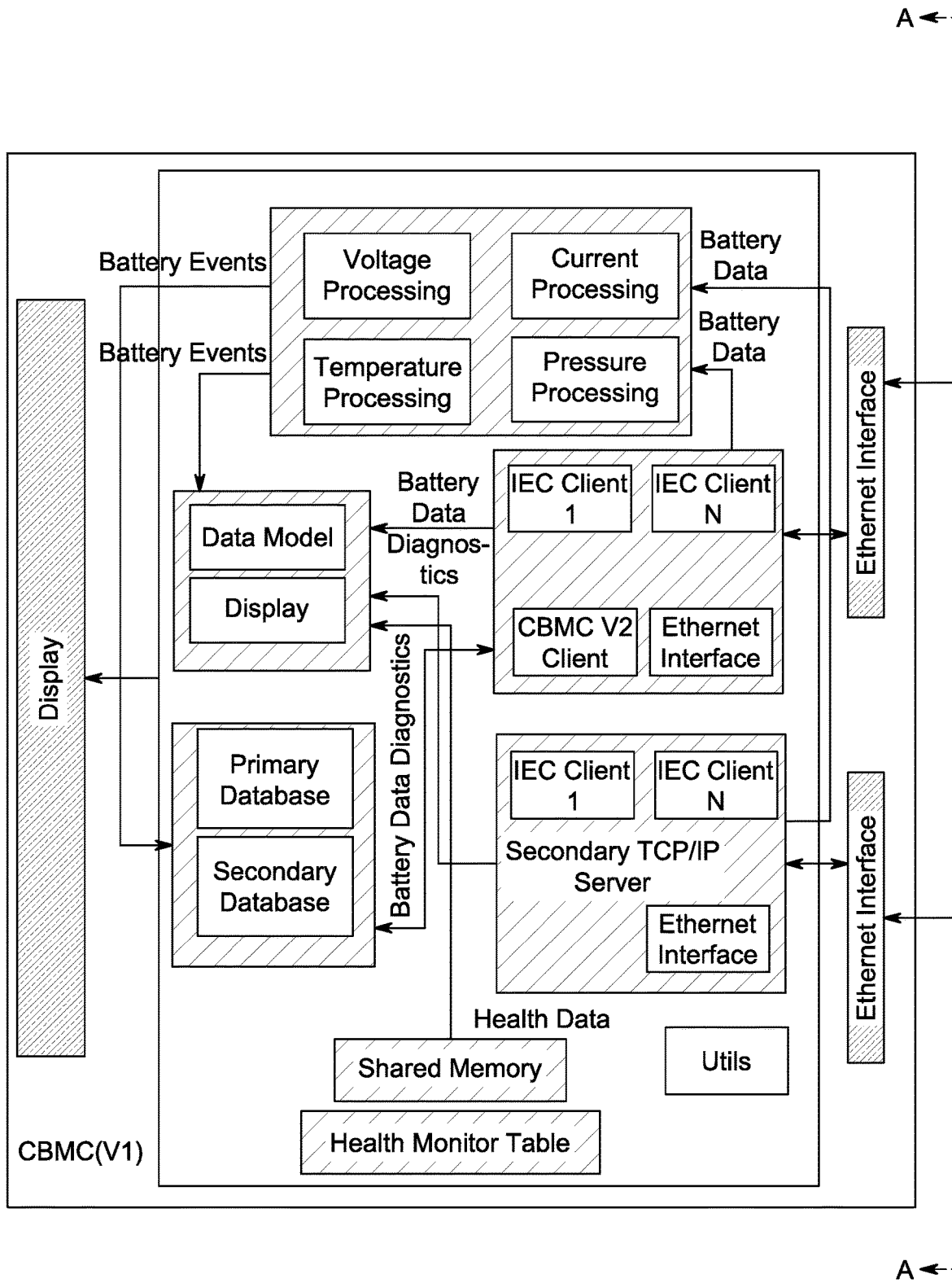
FIG. 5A shows a partial view of an embodiment of CBMS Software Architecture.
Figure 5B:
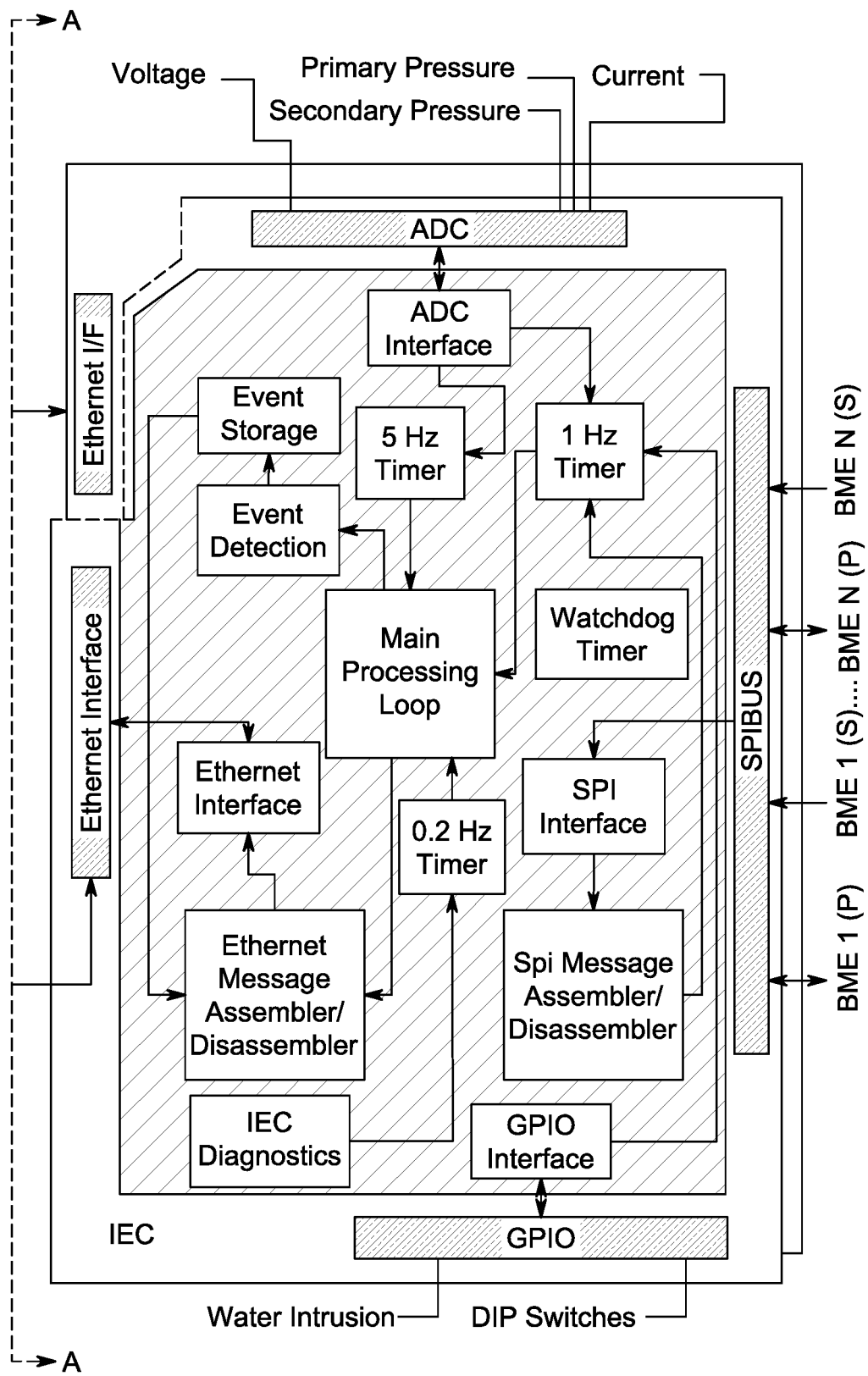
Figure 6:
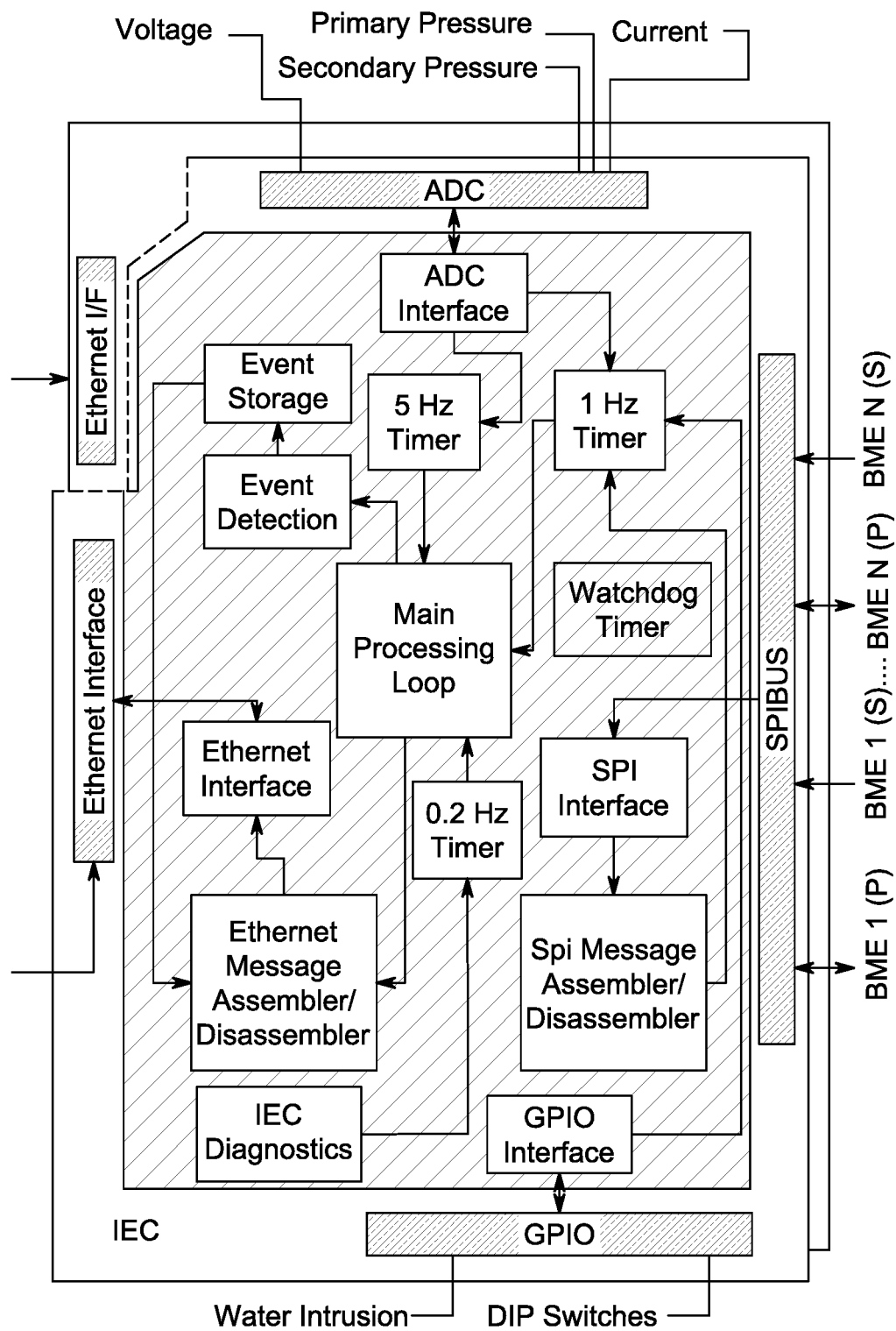
FIG. 6 shows an embodiment of CBMS Software Architecture (Storage Configuration).

FIGS. 4A and 4B depict the software architecture for CBMS in the 'charging/balancing' configuration. FIGS. 5A and 56 depict the software architecture for CBMS in the deployed vehicle configuration. FIG. 6 depicts the software architecture in the storage configuration.

In FIGS. 4A, 4B, 5A, 56, and 6 safety critical software functionality is depicted by the software modules within the central blocks. Except for the software modules identified as UTILS, Shared Memory, and Health Monitoring, all other software modules and their functionality are considered safety critical.

CBMS is comprised of three major hardware processing elements: (1) CBMC (V1/V2), (2) CBMU, and (3) IEC. In addition, CBMS includes the SCCP which is hardware only (e.g., no software), the standard 19-inch rack, and three Ethernet switches. The CBMUs, IECs, and BM Es allow two independent parallel processing paths from the sensor to the display as shown in FIG. 7.

Figure 7:
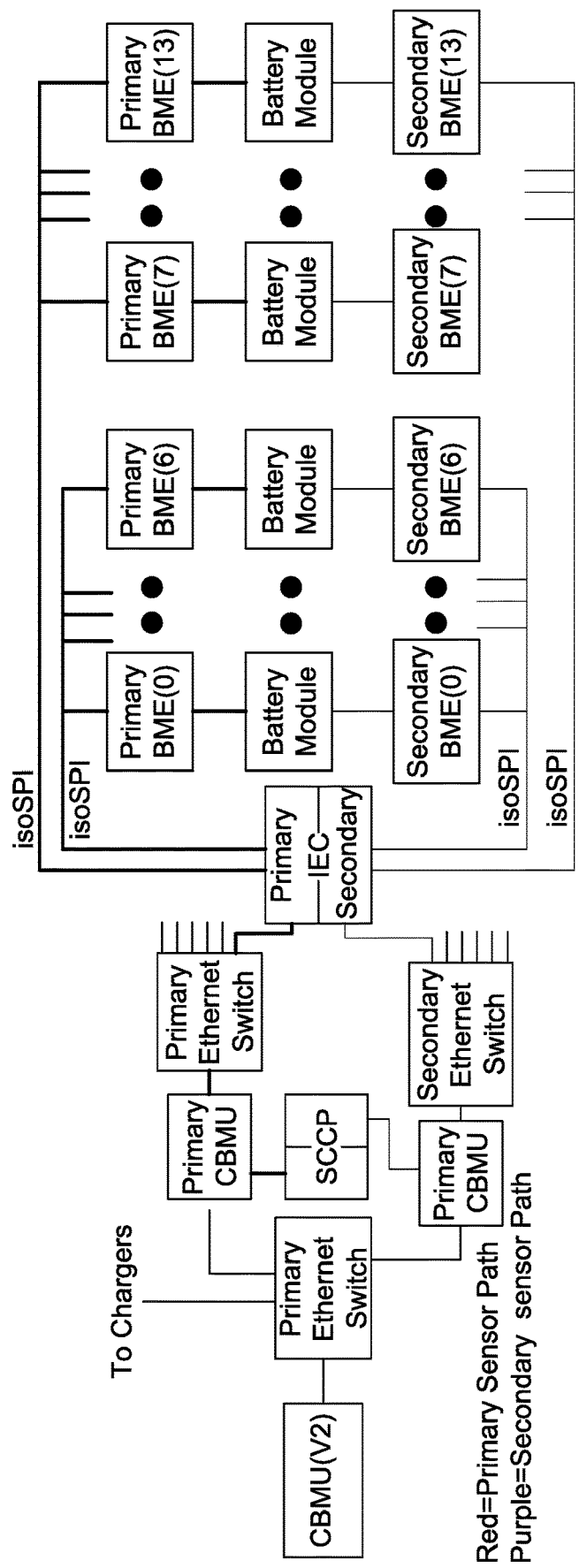
FIG. 7 shows an embodiment of primary and Secondary Sensor Paths, Processing, Display of Alerts and Alarms.

As shown in FIG. 7, the IEC interfaces with the BME described above via redundant isoSPI networks (primary and secondary). The IEC resides physically in a battery and is implemented as a single board with a split Printed Circuit Board (PCB). Each half of the IEC independently provides (1) conversion of isoSPI to Ethernet, (2) A/D conversion of battery voltage, battery current, and water intrusion, (3) detection of changes in battery pressure, (4) dip switches to identify the unique TCP/IP address of the battery, and (5) dip switches to identify the number of BM Es attached to that IEC using redundant Texas Instruments RM48X microcontrollers (primary and secondary). From a safety perspective, the TCP/IP dip switches allow a direct relationship between the battery being charged and the charger to which the battery is connected. This relationship allows the operator to know which charger should be shutting down in the event of an alarm on a given battery. The dip switches identifying the number of BMEs provide support both a safety function and the ability for CBMS to accommodate different battery configurations. From a safety perspective the BM E dip switches allow the IEC and CBMU to isolate isoSPI network issues.

Each half of the IEC contains an Ethernet port that interfaces with redundant Ethernet switches (primary and secondary). These Ethernet switches reside on the deployable vehicle. Each battery has an assigned port on each switch. The number of batteries that can be supported is determined by two factors: (1) the number of ports on these Ethernet switches and the number of SCCP-2 panels present in the charging rack (e.g., 1 SCCP-2 panel supports one battery). The primary Ethernet switch interfaces with the primary CBMU and the secondary Ethernet switch interfaces with the secondary CBMU. These two data paths may be independent and not share resources.

Each independent CBMU may be implemented using a Curtiss Wright VPX3-1220 SBC and Green Hills Integrity 178B Operating System (OS). The application code may be written in C++. Each SBC includes a transition module that provides the physical connections for Ethernet and RS232 interfaces. The Ethernet interfaces with the batteries via the Ethernet switch located on the deployable vehicle and with the CBMC (V2) via an Ethernet switch located in the charging rack. An independent RS232 interface from each CBMU interfaces with the SCCP. The SCCP is comprised of two types of panels (e.g., SCCP-1 and SCCP-2) each of which is again split (e.g., primary, and secondary) to provide independent indications of alerts, alarms, response to controls, and status. The SCCP-1 and SCCP-2s are powered by redundant power supplies. The redundancy across the system results in no single points of failure that would lead to a catastrophic event.

The SCCP-1, FIG. 8, panel contains three major sections: (1) Left side displays the output of the primary CBMU in response to sensor processing or the actions of the operator to clear or acknowledge alerts and alarms. The left side also provides a differential I2C link to the primary side of each of the SCCP-2 panels (2) The center section contains the common hardware components that effect both CBM Us and have a high reliability (e.g., switches). (3) Right side displays the output of the Secondary CBMU in response to sensor processing or the actions of the operator to clear or acknowledge alerts and alarms.

Figure 9:
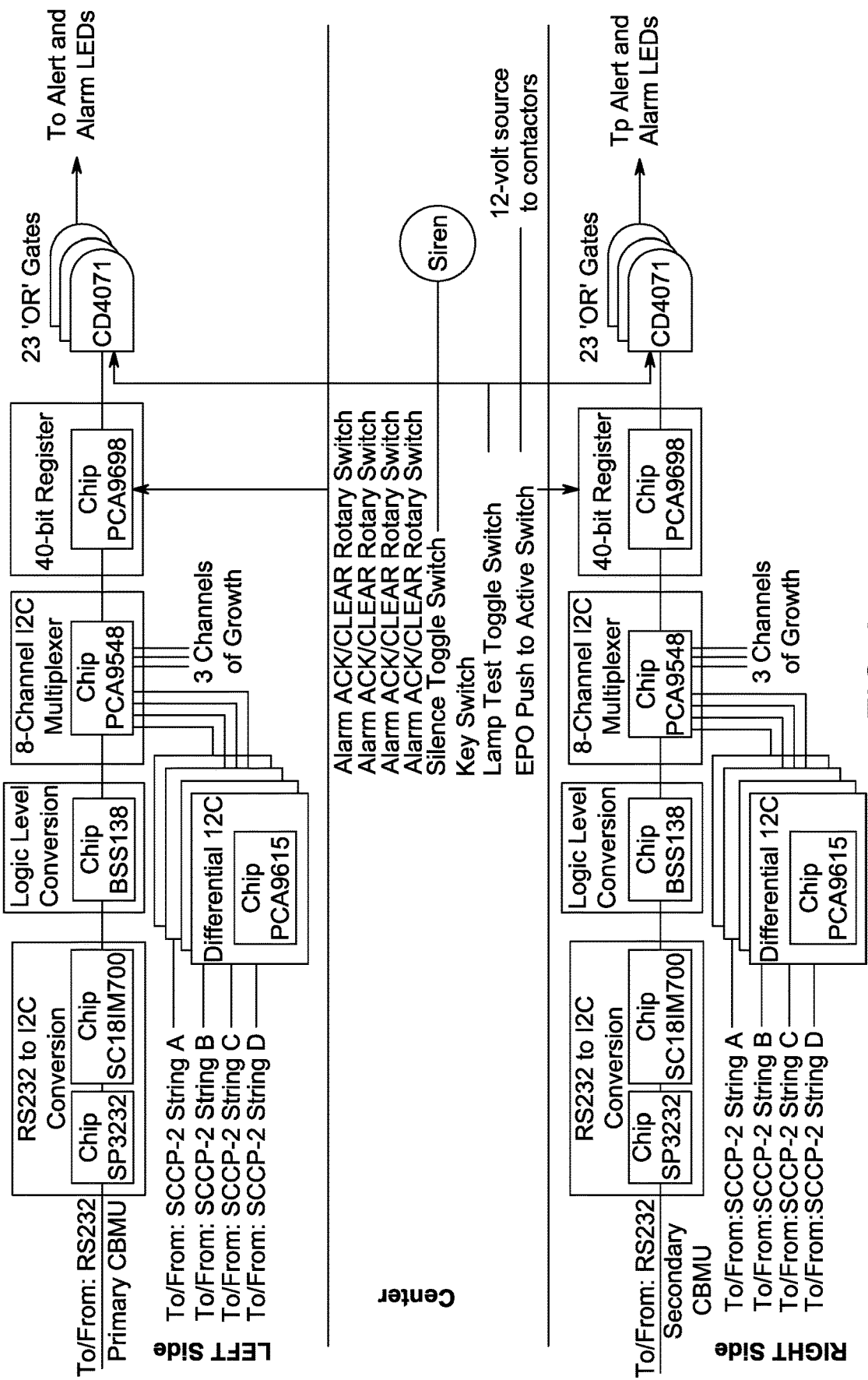
FIG. 9 shows an embodiment of SCCP-1 Data and Control Major Hardware Components.

FIG. 9 depicts the major hardware components down to the chip level for the data and control logic flow for each side and center portions of SCCP-1.

The bit designations in the 40-bit register (PCA9698) for reading the switches and illuminating the alert, alarm, and status LEDs is provided in Table 3. The "U" numbers refer to the 'OR' gate used for that signal.

Figure 10:
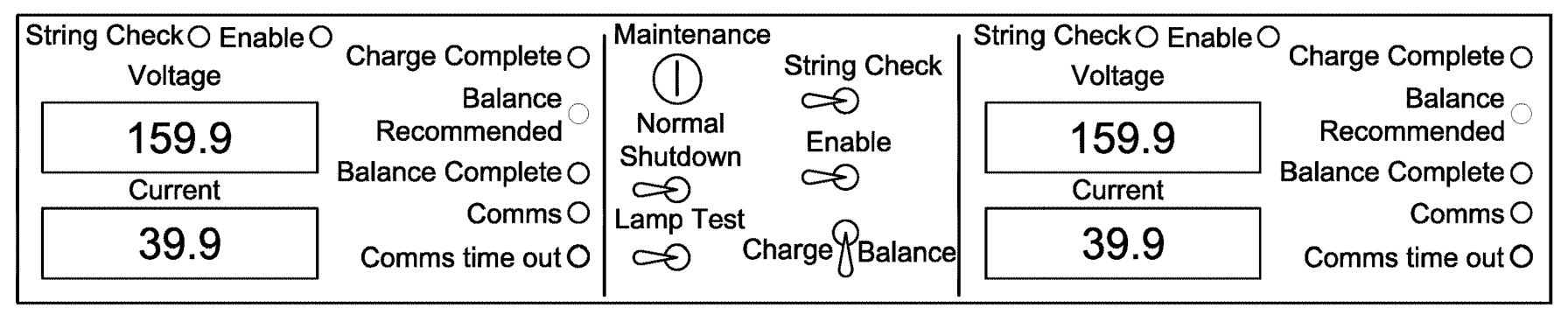
Figure 11:
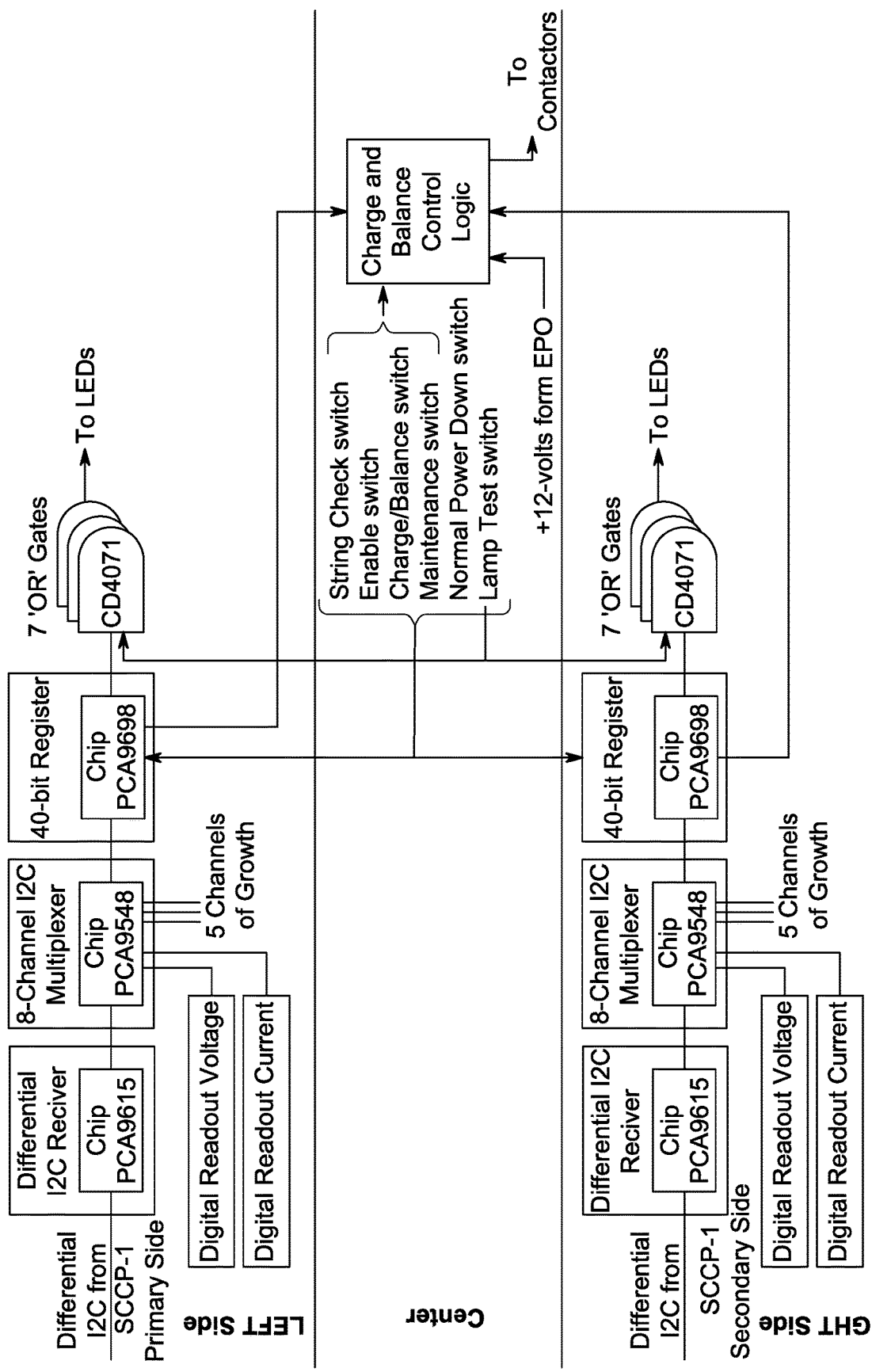
FIG. 11 shows an embodiment of SCCP-2 Data and Control Major Hardware Components.

SCCP-2 depicted in FIG. 10, is divided into 3 sections that replicate the panel layout of SCCP-1. In CBMS there is one SCCP-2 panel for each string. This allocation allows each string to be independently managed and controlled during the charging or balancing process. Specifically, it is possible to charge some strings if one or more strings are in maintenance mode or have reached their fully charged condition. FIG. 11 depicts the major hardware components down to the chip level for the data and control logic flow for each side, and the center portions of the SCCP-2.

FIG. 12 depicts the detailed design of the Charge and Balance Control logic. The functionality of the Charge and Balance Control logic is provided in Table 1.

Figure 12A:
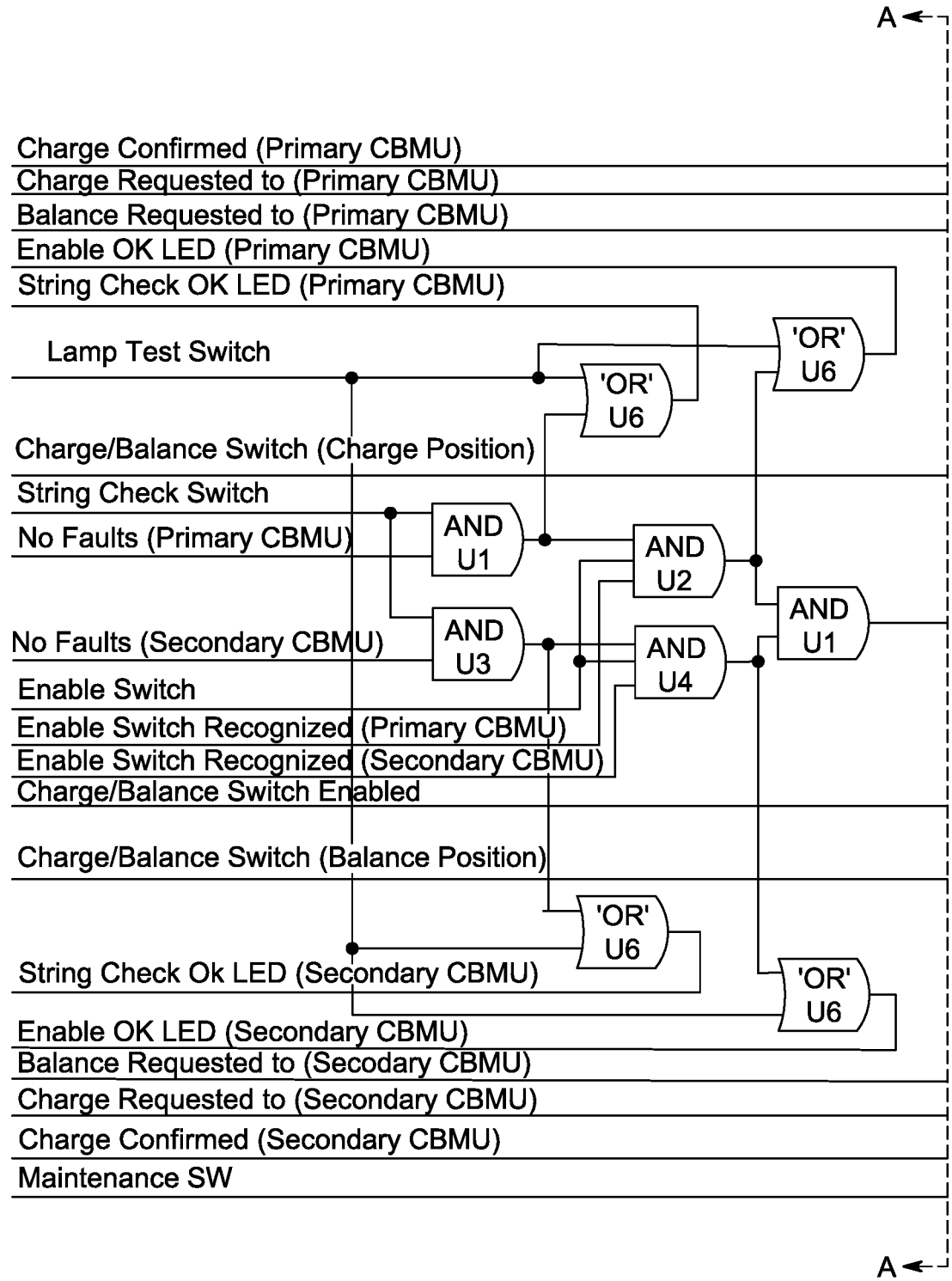
FIG. 12A shows a partial view of an embodiment of SCCP-2 Charge/Balance Control Logic.
Figure 12B:
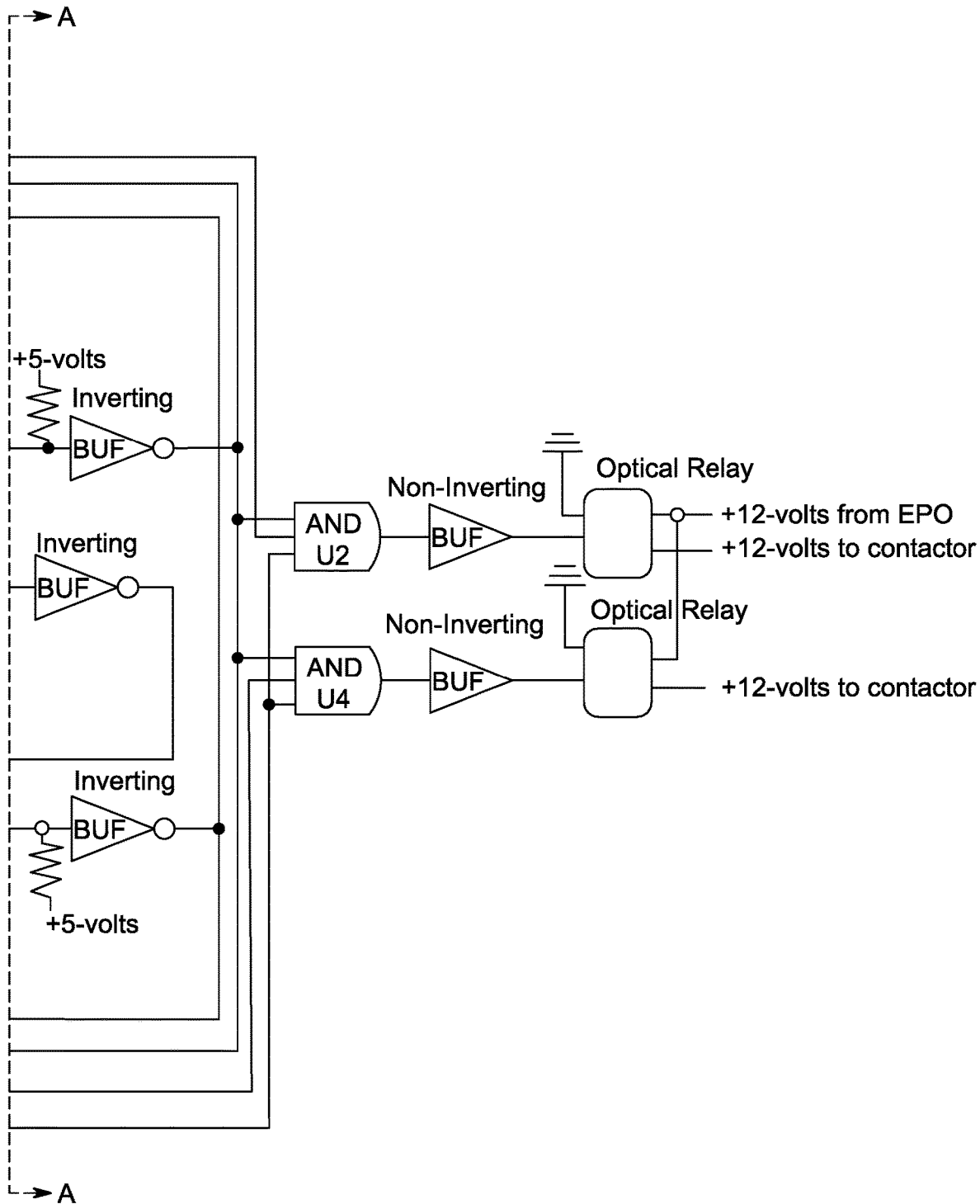
FIG. 12B shows a continuation of FIG. 12A and a partial view of an embodiment of SCCP-2 Charge/Balance Control Logic.

As shown in FIGS. 12A and 12B, the charge and balance controls may use a combination of the operator moving switches and the software (CBMU) responding to those switch movements. In embodiments, neither the operator or the software can independently initiate a charge or balance process. Referring to FIGS. 12A and 12B, the controls associated with each CBMU pass through separate logic chips with only U1 and the inverting buffer being common for both CBMUs. If either of these circuits fail, the system cannot initiate a charge because: (1) the software monitors all three switches and they must occur in the proper sequence (e.g., string check, then enable, then charge/balance) for the process to be initiated, and (2) the operator would have to move the charge/balance switch from neutral to either charge or balance.

In addition to communicating with the SCCP, each CBMU communicates with the CBMC(V2) in the charging/balancing configuration. The CBMC(V2) may also be implemented using the Curtiss Wright VPX3-1220 SBC and Green Hills Integrity 178B OS. The application code may be written in C++. CBMC(V2) may provide the following capabilities:

A third analysis of the battery data to set alerts and alarms;
An interface with each battery charger;
Interface to each CBMU;
Storage of battery data;
Interface to the GUI processor;
Retrieval of battery data.

The CBMC(V2) and the redundant CBMU may reside in the same chassis within the charging rack and may be powered by redundant power supplies.

In embodiments, the battery subsystem at the batteries level, there are no changes. In this configuration there are no chargers.

For this configuration, the CBMS Subsystem the CBMU (V2), the redundant CBMUs, and the SCCP are removed. These hardware elements are replaced by the CBMC(V1) which interfaces with indicators and a touch screen on the high voltage panel.

The CBMC(V1) may be implemented with the Curtiss Wright VPX3-1220 running Green Hills Integrity 1786 OS. CBMC(V1) resides on a vehicle and provides the following capabilities:

Redundant interfaces to the battery bottle IECs;
Analysis of battery data to set alerts and alarms;
Storage of battery data;
Interface to the High Voltage Panel for display of battery related information;
Interface to CBMC(V2) for the retrieval of battery data gathered during the mission.

The battery is the only hardware element in the storage configuration. In this configuration, if the IEC does not detect an Ethernet connection, it will go into a low power mode where it monitors the battery for pressure changes. If there is an abrupt change in pressure indicating a cell rupture, the IEC will record the event and store the event in the RM48X memory. When an Ethernet connection is made this event log will be downloaded and analyzed to determine if any pressure issue occurred.

The Critical Battery Management System (CBMS) implements widely used interfaces (isolated serial peripheral interface, serial peripheral interface, CANbus, RS232) between the battery and the battery management system that enables the direct application of CBMS to multiple battery technologies (e.g., lithium-ion, silver oxide, etc.).

The Critical Battery Management System (CBMS) is modular in design allowing the direct application of CBMS to multiple battery configurations. (e.g., 1 to 8 batteries simultaneously).

Critical Battery Management System (CBMS) employs a combined software, hardware, and operator control mechanisms to prevent the unintentional initiation of the charging process.

The Critical Battery Management System (CBMS) employs multiple mechanisms (software (set alarm and open contacts), hardware (de-activate string check, enable, charge or Emergency Power OFF (EPO) switch) to terminate the charging process to prevent a catastrophic event occurring during the charging process.

The Critical Battery Management System (CBMS) employs multiple mechanisms (software (set alarm and open contacts), hardware (de-activate string check, enable, charge or Emergency Power OFF (EPO) switch) to terminate the charging process to prevent a catastrophic event occurring during the charging process.

The Critical Battery Management System (CBMS) employs redundancy at the sensor, interface, processing, and display level to minimize single points of failure.

The Critical Battery Management System (CBMS) software employs sequential switch processing to eliminate unintentional actions, non-detectable failures and detect any single point of failure.

The Critical Battery Management System (CBMS) employs software for a safety certified (e.g., Texas Instruments RM48X) embedded processor that does not require an operating system to achieve safety requirements.

The Critical Battery Management System (CBMS) can simultaneously monitor from 1 to 10 sensors including voltage, temperature, current, pressure, and water intrusion.

As used herein, a battery monitoring unit includes or may be synonymous with a Critical Battery Management System (CBMS).

As used herein, an 'out-of-tolerance condition' can be a value too low or a value too high for a parameter being measured. In embodiments, parameters can be stored in a file in the software where they can be configured to address the specific battery technology, e.g., Li ion, metal hydride, etc., and battery size. In embodiments, there are a number of parameters that can be measured which include high temperature, low temperature, over voltage, over current, low-voltage, high-pressure, low-pressure, voltage mismatch, water intrusion, communication errors, and/or over pressure rate.

As used herein an alert or alarm may be visual, (e.g., a light), sound (audio alarm or message), display, (e.g. via the GUI), text message, email, etc.

As used herein, the term vehicle may refer to any vehicle civilian or military that can be electric or battery powered. This includes civilian passenger vehicles and trucks as well as manned and unmanned military vehicles.

As used herein, a battery may be a lithium-ion battery or nickel metal hydride and may include high-power batteries used in vehicles. See e.g., Electric vehicle battery, Wikipedia, the free encyclopedia, last edited 5 Jul. 2021, herein incorporated by reference; and Lithium-ion battery, Wikipedia, the free encyclopedia, last edited 11 Aug. 2021, herein incorporated by reference.

As used herein, a battery typically includes a group of series connected battery cells. See e.g., Electric battery, Wikipedia, the free encyclopedia, last edited 2 Aug. 2021, herein incorporated by reference.

While this disclosure includes specific examples, it will be apparent after an understanding of the disclosure of this application has been attained that various changes in form and details may be made in these examples without departing from the spirit and scope of the claims and their equivalents.

The invention claimed is:

1. A battery safety management system comprising:
   a battery charging system configured to provide charge or balancing power to one or more batteries;
   an interface configured to communicate with one or more battery sensors that monitor the one or more batteries;
   a control panel comprising displays and controls in communication with a battery monitoring unit;
   the battery monitoring unit comprising a processor and memory in communication with the interface configured to communicate with one or more battery sensors;
   a computer comprising a processor and memory configured to be in communication with the battery charging system and the battery monitoring unit;
   the battery monitoring unit configured to conduct a charging or balancing process and monitor the one or more batteries for an out of tolerance condition;
   wherein if an out of tolerance condition occurs during charging or balancing in the one or more batteries:
      the battery monitoring unit interrupts the charging or balancing process of the one or more batteries by disconnecting the one or more batteries with the out of tolerance condition from the control panel;
      the battery monitoring unit provides an alert to an operator to interrupt the charging or balancing process to the one or more batteries with the out of tolerance condition via an operator controlled switch;
      the battery monitoring unit interrupts power to the control panel providing power to the one or more batteries with the out of tolerance condition.

2. The battery safety management system of claim 1, wherein if during charging or balancing an out of tolerance condition occurs:
   the battery safety management system provides an alert to an operator to interrupt the charging or balancing process via a second switch.

3. The battery safety management system of claim 1, wherein if during charging or balancing an out of tolerance condition occurs:
   the battery safety management system provides an alert to an operator to interrupt the charging or balancing process by interrupting power to all batteries.

4. The battery safety management system of claim 2, wherein if during charging or balancing an out of tolerance condition occurs:
   the battery safety management system provides an alert to an operator to interrupt the charging or balancing process by interrupting the charging or balancing process via a third switch.

5. The battery safety management system of claim 1, wherein the battery safety management system further comprises a graphical user interface.

6. The battery safety management system of claim 1, wherein the one or more battery sensors comprise a temperature sensor, a voltage sensor, a current sensor, a water sensor, a communication sensor, a pressure sensor, or any combination thereof.

7. The battery safety management system of claim 1, wherein the out of tolerance condition comprises an over voltage condition, an over current condition, an over pressure condition, a water intrusion condition, or an over pressure rate condition, or any combination thereof.

8. The battery safety management system of claim 1, wherein the one or more batteries comprise between one and eight batteries.

9. The battery safety management system of claim 1, wherein the system further comprises a separate redundant component for each of the computer, the control panel, the interface, and the battery monitoring unit.

10. The battery safety management system of claim 1, wherein the alert is an alarm.

11. The battery safety management system of claim 1, wherein the computer is in communication with external battery chargers.

12. A process for monitoring the safety of one or more batteries with the battery safety management system of claim 1 comprising:
- monitoring the one or more batteries with the battery monitoring unit, said battery monitoring unit in communication with one or more battery sensors;
- monitoring the battery charging system with the computer;
- initiating a battery charging or balancing process with the battery monitoring unit via controls on the control panel;
- monitoring the one or more batteries during the battery charging or balancing process with the battery monitoring unit for an out of tolerance condition;
- wherein if during the charging or balancing process an out of tolerance condition occurs in the one or more batteries the process further comprises:
  - interrupting the charging or balancing process of the one or more batteries with the battery monitoring unit by disconnecting the one or more batteries with the out of tolerance condition from the control panel;
  - providing an operator alert to interrupt the charging or balancing process to the one or more batteries with the out of tolerance condition via an operator controlled switch;
  - interrupting power to the battery charging system providing power to the one or more batteries with the out of tolerance condition with the control panel.

13. The process of claim 12, wherein if during the charging or balancing process an out of tolerance condition occurs in the one or more batteries the process further comprises:
- providing an operator alert to interrupt the charging or balancing process via a second switch.

14. The process of claim 12, wherein if during the charging or balancing process an out of tolerance condition occurs in the one or more batteries the process further comprises:
- providing an operator alert to interrupt the charging or balancing process by interrupting power to all one or more batteries.

15. The process of claim 13, wherein if during the charging or balancing process an out of tolerance condition occurs in the one or more batteries the process further comprises:
- providing an operator alert to interrupt the charging or balancing process by interrupting the charging or balancing process via a third switch.

16. The process of claim 12, wherein the one or more batteries includes a lithium ion battery.

17. The process of claim 12, wherein the battery management system further comprises a graphical user interface.

18. The process of claim 12, wherein the one or more battery sensors comprise a temperature sensor, a voltage sensor, a current sensor, a water sensor, a communication sensor, or a pressure sensor, or any combination thereof.

19. The process of claim 12, wherein the out of tolerance condition comprises high temperature, low temperature, over voltage, over current, low-voltage, high-pressure, low-pressure, voltage mismatch, water intrusion, communication errors, or over pressure rate, or any combination thereof.

20. The process of claim 12, wherein the one or more batteries comprise between one and eight batteries.

* * * * *